United States Patent
Heil et al.

(10) Patent No.: US 10,106,141 B2
(45) Date of Patent: Oct. 23, 2018

(54) METHODS AND SYSTEMS OF TESTING VEHICLE BRAKING SYSTEMS

(71) Applicant: GM GLOBAL TECHNOLOGY OPERATIONS LLC, Detroit, MI (US)

(72) Inventors: Edward T. Heil, Howell, MI (US); Eric E. Krueger, Chelsea, MI (US); Joshua R. Auden, Brighton, MI (US); Robert L. Nisonger, Milford, MI (US); Patrick J. Monsere, Highland, MI (US); Brandon C. Pennala, Howell, MI (US); Constandi J. Shami, Ann Arbor, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 67 days.

(21) Appl. No.: 15/463,933

(22) Filed: Mar. 20, 2017

(65) Prior Publication Data

US 2018/0265068 A1 Sep. 20, 2018

(51) Int. Cl.

| | |
|---|---|
| *B60T 17/20* | (2006.01) |
| *B60T 17/22* | (2006.01) |
| *B60T 13/66* | (2006.01) |
| *B60T 11/10* | (2006.01) |
| *B60T 8/172* | (2006.01) |

(52) U.S. Cl.
CPC .......... *B60T 17/222* (2013.01); *B60T 8/172* (2013.01); *B60T 11/103* (2013.01); *B60T 13/662* (2013.01); *B60T 17/225* (2013.01)

(58) Field of Classification Search
CPC .... B60T 17/222; B60T 13/662; B60T 11/103; B60T 8/172; B60T 17/225
See application file for complete search history.

(56) References Cited

U.S. PATENT DOCUMENTS

| | | | |
|---|---|---|---|
| 2011/0112774 A1* | 5/2011 | Gilles | B60T 8/4059 702/50 |
| 2014/0136068 A1* | 5/2014 | Peltz | B60T 17/22 701/70 |
| 2016/0311422 A1* | 10/2016 | van Zanten | G01M 3/2869 |
| 2018/0065607 A1* | 3/2018 | Masuda | B60T 8/17 |

* cited by examiner

*Primary Examiner* — Richard M Camby
(74) *Attorney, Agent, or Firm* — Lorenz & Kopf, LLP (57) ABSTRACT

Systems and methods are provided testing a vehicle braking system. The method includes determining a nominal brake system parameter of the brake system during a braking operation. A first testing brake operation is performed and a first brake system parameter is determined based on the first testing brake operation. A tested brake system parameter is determined based on the first testing system parameter and the tested brake system parameter is compared to the nominal brake system parameter. A brake system compliance suspicion value of the vehicle braking system is then set based on the comparison.

20 Claims, 6 Drawing Sheets

METHODS AND SYSTEMS OF TESTING VEHICLE BRAKING SYSTEMS

TECHNICAL FIELD

The present disclosure generally relates to vehicle braking systems, and more particularly relates to methods and systems for testing braking systems for hydraulic leaks and compliance degradations.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

For highly autonomous vehicles there is a need for the braking system to monitor its own functionality to replace the brake system monitoring that would otherwise be done by a human driver in a conventionally operated vehicle. Specifically, the autonomous vehicle needs to monitor the braking system performance for hydraulic leaks and compliance degradations due to the presence of air in the hydraulic fluid. These issues are diagnosed by observing and comparing the measured brake fluid volume that is pumped into the brake system to the measured system pressure. This testing can be done both passively and actively. Passive tests would observe the reaction of the pedal during normal driving maneuvers, but may not be a sufficient maneuver to robustly evaluate the system. Active tests are more effective and will give the most robust testing results.

Accordingly, it is desirable to provide systems and methods that allow the brake control system to test the braking system for hydraulic leaks and compliance degradations. Furthermore, other desirable features and characteristics of the present invention will become apparent from the subsequent detailed description and the appended claims, taken in conjunction with the accompanying drawings and the foregoing technical field and background.

SUMMARY

Systems and methods are provided testing a vehicle braking system. In a non-limiting embodiment, the method includes determining a nominal brake system parameter of the brake system during a braking operation. The method further includes performing a first testing brake operation and determining a first brake system parameter based on the first testing brake operation. The method further includes determining a tested brake system parameter based on the first system parameter, comparing the tested brake system parameter to the nominal brake system parameter, and setting a brake system compliance suspicion value of the vehicle braking system based on the comparison.

In a non-limiting embodiment, a system for testing a braking system of a vehicle, includes a brake parameter module configured for determining a brake parameter of the braking system during a brake operation. The system further includes a brake system control module for operating the brake parameter module based on a brake test profile. The system further includes a brake system compliance module configured for determining a brake system compliance suspicion value of the braking system based on the comparison between a tested brake system parameter and a nominal brake system parameter. The tested brake system parameter is based on a first testing brake operation and the nominal brake system parameter is based on a design target parameter.

In a non-limiting embodiment, a vehicle includes a wheel having a brake and a braking system. The braking system includes a brake parameter module configured for determining a brake parameter of the brake during a brake operation. The braking system further includes a brake system control module for operating the brake parameter module based on a brake test profile and a brake system compliance module configured for determining a brake system compliance suspicion value of the braking system based on the comparison between a tested brake system parameter and a nominal brake system parameter. The tested brake system parameter is based on a first testing brake operation and the nominal brake system parameter is based on a design target parameter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
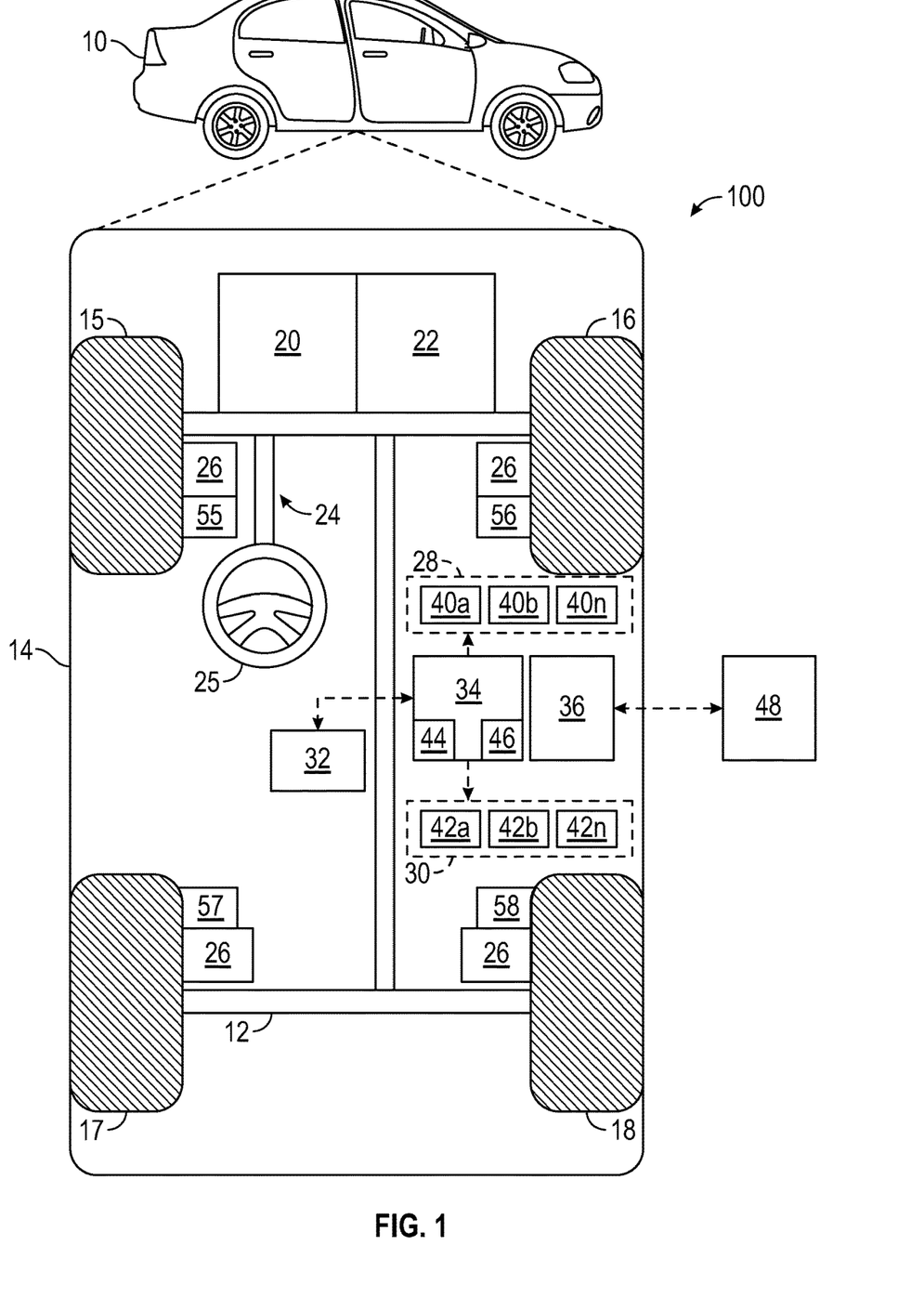
FIG. 1 is a functional block diagram illustrating an autonomous vehicle having a system for testing a braking system, in accordance with various embodiments.

With reference to FIG. 1, a system shown generally at 100 is associated with a vehicle 10 in accordance with various embodiments. In general, system 100 tests a braking system 26 of a vehicle of vehicle 10 to for hydraulic leaks and compliance degradations in the braking system 26.

As depicted in FIG. 1, the vehicle 10 generally includes a chassis 12, a body 14, wheels 15-18, and brakes 55-58. The body 14 is arranged on the chassis 12 and substantially encloses components of the vehicle 10. The body 14 and the chassis 12 may jointly form a frame. The wheels 15-18 are each rotationally coupled to the chassis 12 near a respective corner of the body 14 and stopped by corresponding brakes 55-58.

In various embodiments, the vehicle 10 is an autonomous vehicle and the system 100 is incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, the brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 15-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 15-18 through brakes 55-58. The brake system 26 may, in various embodiments, include friction brakes, brake by wire, a regenerative braking system such as an electric machine, and/or other appropriate braking systems in addition to brakes 55-58. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the system 100 and, when executed by the processor 44, observe the long term brake system 26 performance and schedules active tests to validate the functional performance of the vehicle 10 braking system 26. For example, the instructions may provide the controller 34 with scheduled active tests of the brake system 26 based upon predetermined events or according to a maintenance schedule.

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
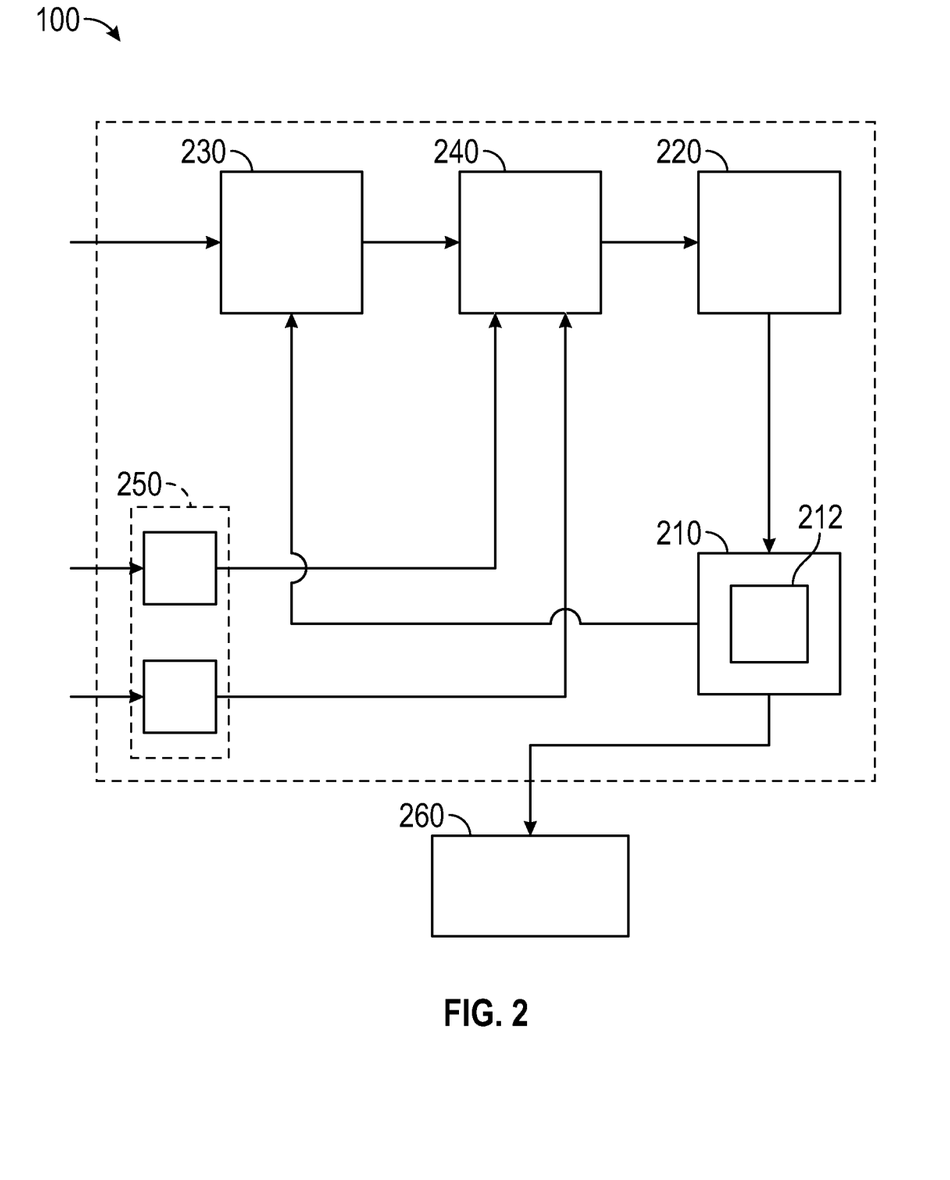
FIG. 2 is a dataflow diagram illustrating the system for testing the braking system of the autonomous vehicle, in accordance with various embodiments.

Referring now to FIG. 2, and with continued reference to FIG. 1, a dataflow diagram illustrates various embodiments of the system 100, which may be embedded within the controller 34. Various embodiments of the system 100 according to the present disclosure may include any number of sub-modules embedded within the controller 34. As can be appreciated, the sub-modules shown in FIG. 2 may be combined and/or further partitioned to similarly control the vehicle 10. Inputs to the system 100 may be received from the sensor system 28, the braking system 26, received from other control modules (not shown) associated with the vehicle 10, received from the communication network 56 at the communication system 36, and/or determined/modeled by other sub-modules (not shown) within the controller 34. In various embodiments, the system 100 includes a brake parameter module 210, a brake system control module 220, a brake system compliance module 230, an active test scheduling module 240, and an acceptability condition module 250.

Generally, system 100 is configured to observe long term brake system 26 performance and schedule an active test with the goal to validate the functional performance of an autonomous vehicle braking system 26. Passive observation of the braking system 26 can occur with every application of brakes 55-58, but normal application of the brakes 55-58 during routine driving may not provide a thorough test of the continued performance of the braking system 26. Accordingly, system 100 is able to implement a long term observation algorithm to determine the suspicion level that may in turn indicate that the brake system 26 may be experiencing a slow leak or has a compliance problem due to air in the brake system 26. When the suspicion level is greater than a predetermined threshold, the system 100 schedules an active test of the brake system 26 so that an active confirmation test can be performed. The system controls the braking system 26 by controlling the brakes 55-58, brake parameter module 210, brake system control module 220, brake system compliance module 230, active test scheduling module 240, and an acceptability condition module 250 to test the health and performance of the braking system 26.

The brake parameter module 210 is configured to determine a brake parameter of the braking system 26 during a braking operation. In a non-limiting embodiment, the brake parameter is at least one of a measurement of a volume of brake fluid displaced during the braking operation, a measurement of a pressure of the brake fluid during the braking operation, a measurement of the volume to pressure relationship of the brake fluid during the braking operation, or a combination thereof. Throughout the operation of the vehicle 10, whenever the brakes 55-58 are engaged with a braking operation to slow the vehicle 10, the brake parameter module collects readings of the brake parameters during the braking operation. In a non-limiting embodiment, a plurality of braking parameters collected over a period of time by the brake parameter module are stored in a database 212.

The brake parameters from the brake parameter module 210 are provided to the brake system compliance module 230. The brake system compliance module is configured to determine a brake system compliance suspicion level of the braking system 26 based on a comparison between a tested brake system parameter and a nominal brake system parameter. As detailed above, during normal operation of the vehicle 10, the brake parameter module 210 determines brake parameters of the braking system 26 during braking operations. The brake system compliance suspicion level is a rough estimate of the current state of the braking system 26. Stated differently, the brake system compliance suspicion level is used as an indicator for when the system 100 should conduct an active test of the braking system 26 and evaluate the braking system 26 more thoroughly than can be done through passive testing. When the brake system compliance suspicion level is greater than a predetermined suspicion level, the brake system compliance module 230 instructs the active test scheduling module 240 to schedule and conduct the active test of the braking system 26.

The brake parameters are provided to the brake system compliance module 230 where they are compared to a nominal brake system parameter. The nominal brake system parameter is a target or reference value representative of a normal or expected parameter associated with the braking system 26. For example, the nominal brake system parameter may be at least one of a measurement of a volume of brake fluid displaced during a normal braking operation, a measurement of a pressure of the brake fluid during a normal braking operation, a measurement of the volume to pressure relationship of the brake fluid during a normal braking operation, or a combination thereof.

As the brake system compliance module 230 obtains the tested brake system parameters over time, the brake system compliance module determines a deviation between the tested brake system parameters and compares the deviation to a first threshold value. When the deviation is greater than the first threshold value, the brake system compliance module 230 increments the brake system compliance suspicion value by a first value. When the deviation is greater than a second threshold value, the brake system compliance module 230 increments the brake system compliance suspicion value by a second value. In a non-limiting embodiment, the first threshold value is greater than the second threshold value and the first value is greater than the second value. Stated differently, as the deviation between tested brake system parameters over time increases, so too does the amount by which the brake system compliance suspicion level is incremented. In this way, as the as the measured performance or health of the braking system 26 deteriorates, the brake system compliance module 230 increments the brake system compliance suspicion value by a greater value to prompt the active test scheduling module 240 to schedule and conduct the active test of the braking system 26.

The active test scheduling module 240 is configured to schedule and conduct the active test of the braking system 26 and instructs the brake system control module 220 to operate the brake parameter module 210 according to a brake test profile. In addition to receiving the brake system compliance suspicion level from the brake system compliance module 230, in a non-limiting embodiment, the active test scheduling module 240 receives acceptability conditions from the acceptability condition module 250. The acceptability conditions include relate to when the vehicle 10 is able to conduct the active test. In a non-limiting embodiment, the acceptability conditions include at least one of a vehicle standstill condition a vehicle service condition, and a vehicle operation condition. Stated differently, in a non-limiting embodiment, in order to perform the active test, acceptability condition module 250 determines whether it is the intent of autonomous drive system to maintain standstill for a minimum amount of time required to perform the active test. Other non-limiting examples include conditions in which there is no chance for a service technician to be working on the vehicle 10, when the vehicle 10 is at standstill, when the vehicle 10 is placed in park and is not intending to drive away for a significant amount of time, or, in the case of an autonomous fleet or service vehicle, after or during a passenger drop off by the vehicle 10.

When the active test has been scheduled by the active test scheduling module 240 and the acceptability conditions from the acceptability condition module 250 have been met, the brake system control module 220 operates the brake parameter module based on a brake test profile. When the system 100 determines that a hydraulic leak, compliance issue, or other repair condition of the braking system 26 has occurred, the system may notify a vehicle health manager 260. Vehicle health manager 260 may be an onboard diagnostic system or communication system.

Figure 3A:
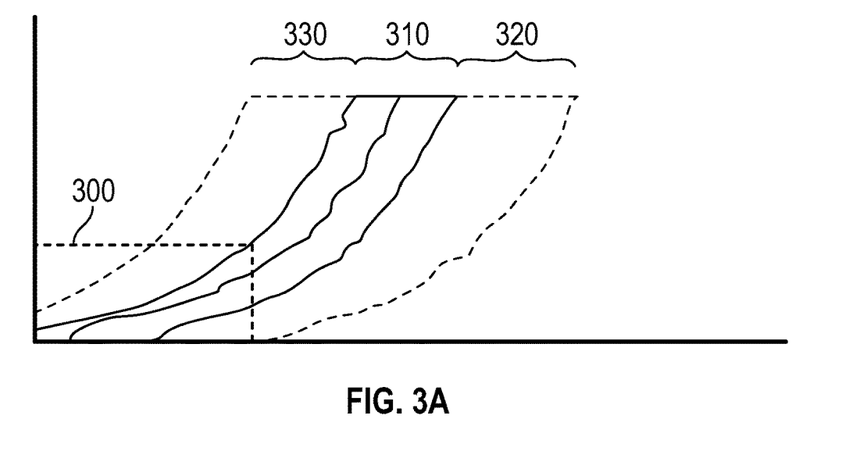
FIGS. 3A-3F illustrate exemplary graphs of brake test profiles and corresponding volume to pressure relations, in accordance with various embodiments.

Referring now to FIGS. 3A-3F, and with continued reference to FIGS. 1-2, the operation of the brake system control module 220, exemplary brake profiles, and exemplary brake parameters will be described with respect to the present system 100. FIG. 3A depicts a graph of the relation between brake fluid volume and brake fluid pressure during a braking operation of the vehicle. The normal comfort braking region 300 indicates the relation between brake fluid volume and brake fluid pressure expected during normal braking operations. As the brake fluid volume and brake fluid pressure increase, the normal, or expected relation is shown in the normal region 310. To either side of the normal region 310 are low stiffness region 320 and high stiffness region 330.

In a non-limiting example, low stiffness region 320 may be indicative of a slow external hydraulic leak, air in the braking system 26, or taper wear on the brake pads.

In a non-limiting example, high stiffness region 330 may be indicative of a hydraulic blockage and could mean that one or more brake calipers are blocked or not functioning properly. When the active test is carried out, the brake parameters determined by the brake parameter module 210 may be compared to the graph in FIG. 3A to aid in identifying issues in the braking system 26.

Figure 3B:
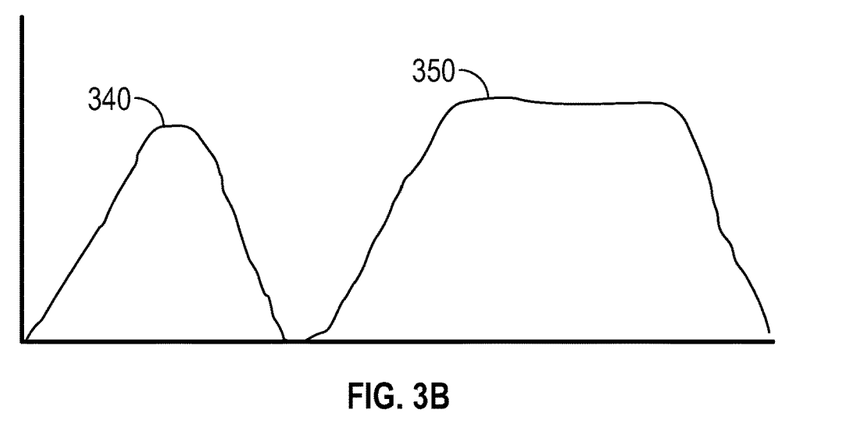

FIG. 3B depicts a plot of a first active brake test profile. As shown in FIG. 3B, the first active brake test profile includes a first testing brake operation 340 and a second testing brake operation. In a non-limiting embodiment, the first testing brake operation 340 is performed to seat the brakes 55-58 and take up any extra compliance to reduce noise factors in the measurement such as knockback. In this way, the second testing brake operation 350 will be more accurate and can be properly evaluated against, for example, the graph from FIG. 3A.

Figure 3C:
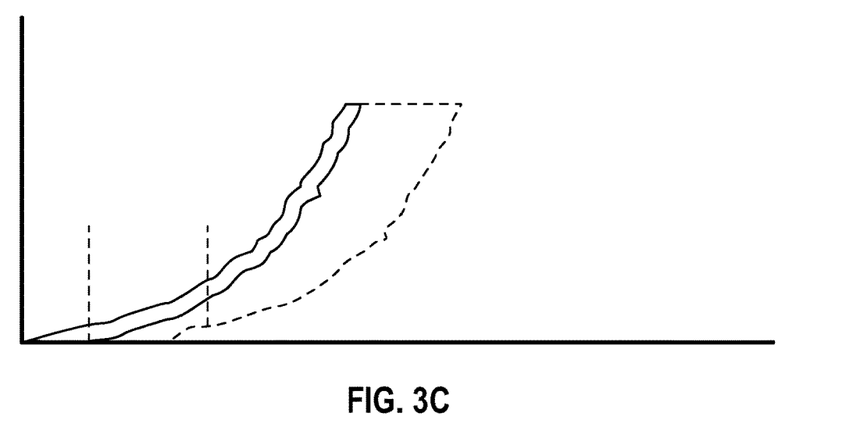

In a non-limiting embodiment, the second testing brake operation 350 is a high pressure brake hold for a predetermined period of time. With reference now to FIG. 3C, an exemplary graph of brake parameters from an active test according to the first brake test profile from FIG. 3B is depicted. In a non-limiting embodiment, the difference between an ending brake fluid volume ($V_{End}$) and a starting brake fluid volume ($V_{Start}$) over the course of the second testing brake operation is determined. In the non-limiting embodiment of FIG. 3C, the difference between $V_{End}$ and $V_{Start}$ resides in the low stiffness region 320, indicating a potential problem with the braking system 26.

Figure 3D:
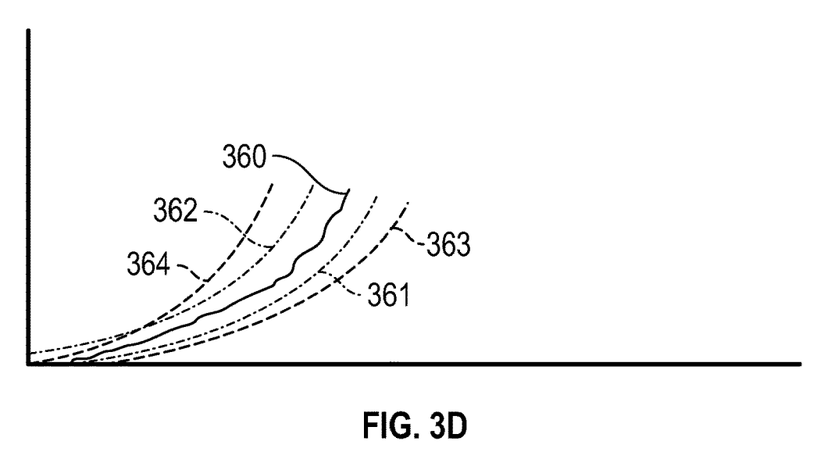

Referring now to FIG. 3D another exemplary graph of brake parameters from an active test according to the first brake test profile from FIG. 3B is depicted. In FIG. 3D, an exemplary compliance monitoring test is being performed using the brake parameters. As detailed above, compliance monitoring may be used to determine whether the braking system 26 is continuing to operate within acceptable design standards. As shown in FIG. 3D a nominal brake system parameter 360 is plotted relative to diagnostic thresholds 361, 362, low system stiffness 363, and high system stiffness 364. In this way, the system 100 can use the brake parameters from the active test to determine if the brake system 26 is operating within the diagnostic thresholds 361, 362, or if the brake system 26 has exceeded the thresholds 361, 362 and needs to be serviced.

As can be appreciated by the depiction of the first active brake test profile, a first testing brake operation 340 followed by a second testing brake operation 350 including a high pressure hold is not the type of braking operation that is to be expected during normal operation of the vehicle 10. Thus, the information regarding the status of the braking system 26 gleaned from the active test using the first active brake test profile cannot be obtained from passive testing of the braking system 26 and can only be obtained from the active test.

Figure 3E:
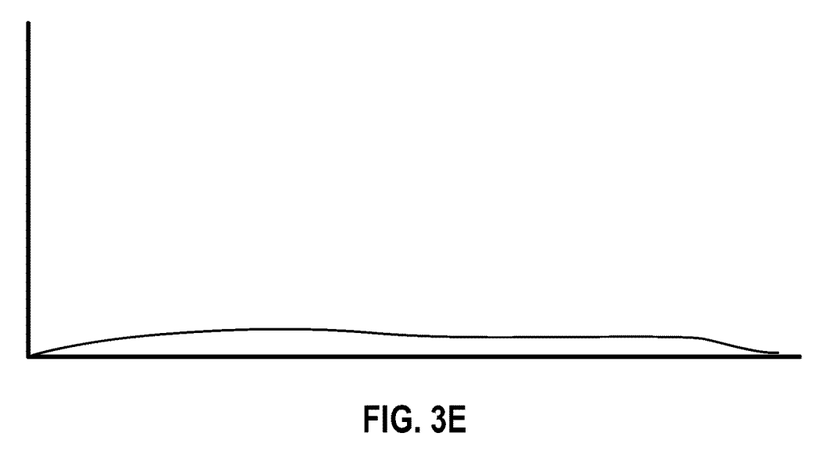
Figure 3F:
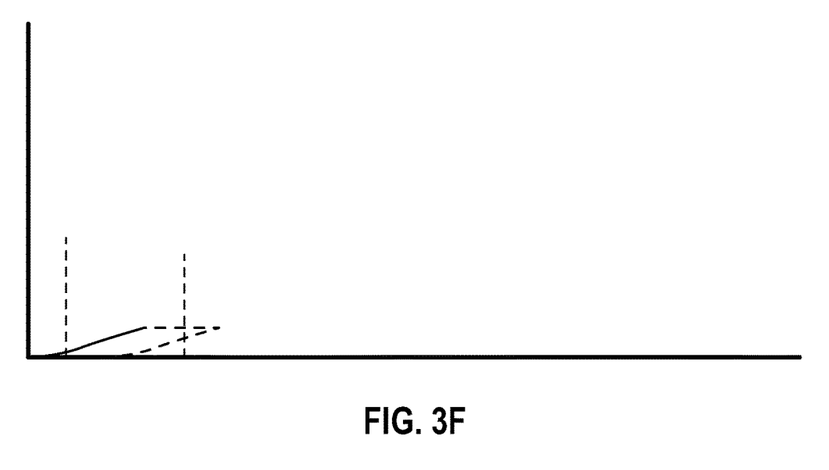

Referring now to FIGS. 3E and 3F a plot of a second active brake test profile and an exemplary graph of brake parameters from an active test according to the second brake test profile from FIG. 3E is depicted. The second active brake test profile is a low pressure hold that is used to identify a slow internal hydraulic leak. As shown in FIG. 3F, the brake fluid volume increase between $V_{Start}$ and $V_{End}$ over the duration of the second active brake test profile is indicative of a slow internal hydraulic leak.

Similar to the first active brake test profile, as can be appreciated by the depiction of the second active brake test profile, a long term, low pressure hold is not the type of braking operation that is to be expected during normal operation of the vehicle 10. While during normal operation of the vehicle 10 low pressure braking operations are to be expected, these operations do not include a continuous, low pressure hold from the second active brake test profile. Thus, the information regarding the status of the braking system 26 gleaned from the active test using the second active brake test profile cannot be obtained from passive testing of the braking system 26 and can only be obtained from the active test.

In a non-limiting embodiment of the system 100, the first and second active brake test profiles include at least one of a full braking system 26 test to all wheels 15-18, a circuit test to each individual brake circuit, and a wheel test to isolate one of the plurality of wheels 15-18 at a time. It is common in vehicles for braking circuits to exist for both front wheels 15, 16 and separately for both rear wheels 17, 18. In such a case, these different implementations of the first and second active brake test profiles allow the system 100 to isolate and components of the braking system 26 down to their most basic components and identify an area that needs to be repaired.

Figure 4:
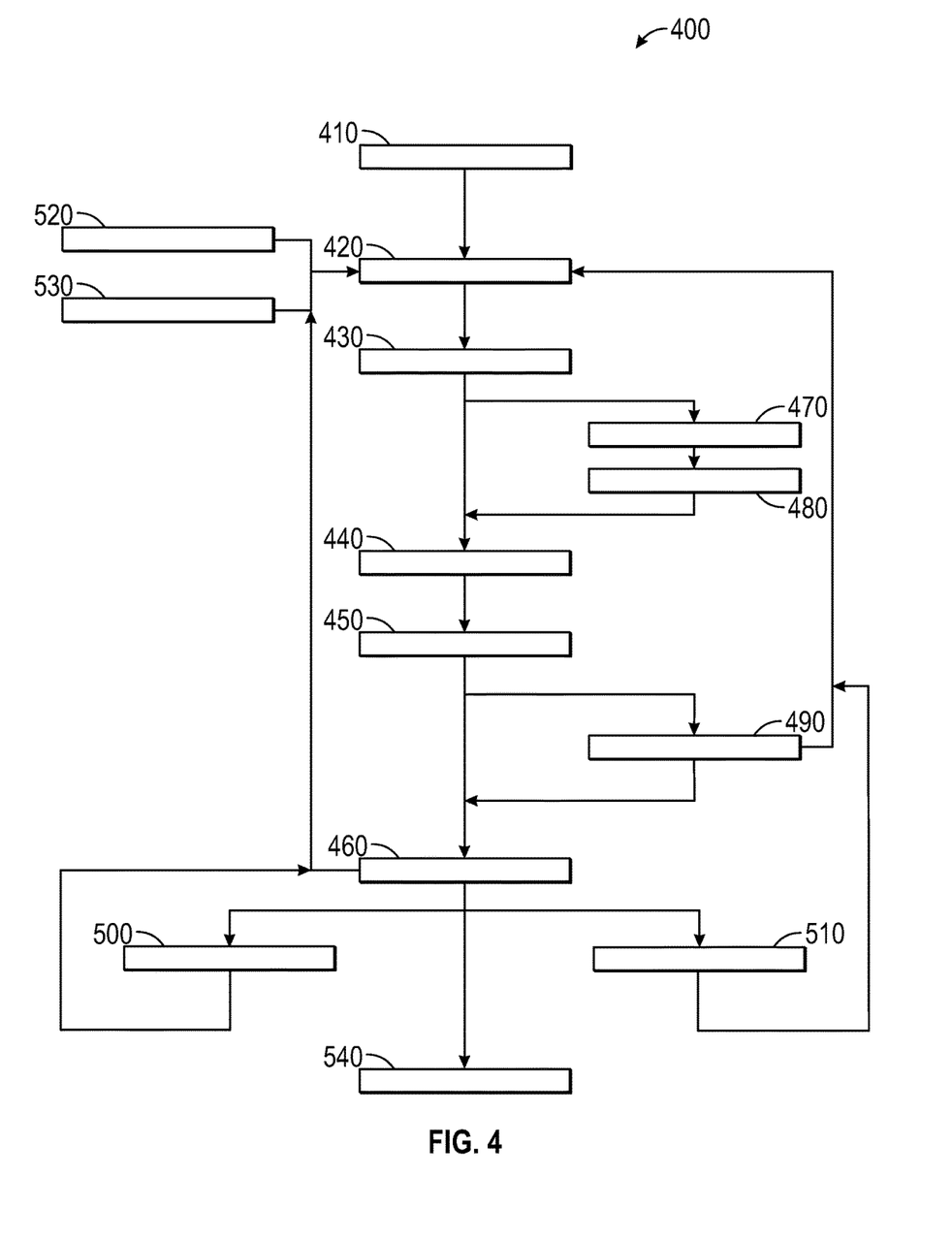
FIG. 4 is a flowchart illustrating a method for testing the braking system of the autonomous vehicle, in accordance with various embodiments.

Referring now to FIG. 4, and with continued reference to FIGS. 1-3, a flowchart illustrates a control method 400 for testing a vehicle braking system that can be performed by the system 100 of FIG. 2 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. In various embodiments, the method 400 can be scheduled to run based on one or more predetermined events, and/or can run continuously during operation of the vehicle 10.

In general, method 400 is an algorithm that monitors brake system parameters of the vehicle braking system to identify hydraulic leaks and compliance degradations. The algorithm continually monitors the braking system by determining brake system parameters obtained from normal braking operations. This allows the algorithm to gradually monitor the braking system wear and loss of functionality. When the algorithm determines that sufficient deviation from the nominal braking parameters has occurred, the algorithm schedules an active test to more thoroughly evaluate the integrity of the braking system, as detailed above.

The method 400 starts at 410 and determines a nominal brake system parameter of the brake system during a braking operation. The method 400 proceeds to 420 and performs a first testing brake operation. At 430 the first brake system parameter is determined based on the first testing brake operation. At 440, the tested brake system parameter is determined based on the first brake system parameter. At 450, the tested brake system parameter is compared to the nominal brake system parameter and at 460, the brake system compliance suspicion value of the vehicle braking system is set based on the comparison. The method then returns to 420 and continues to perform the first testing brake operation based on the brake system compliance suspicion value.

In a non-limiting embodiment, the method 400 further includes 470 and performs a second testing brake operation and 480 to determine a second brake system parameter based on the second testing brake operation. The method 400 then proceeds to 440 and determines the tested brake system parameter based on the first and second brake system parameters.

In a non-limiting embodiment of the method 400, the first testing brake operation is a low pressure brake hold for a predetermined period of time. In a non-limiting embodiment of the method 400, the first testing brake operation is a brake seating operation and the second testing brake operation is a high pressure brake hold for a predetermined period of time. In a non-limiting embodiment of the method 400, the nominal brake system parameter, first brake system parameter, second brake system parameter, and tested brake system parameters are a measurement of a volume to pressure relationship of the vehicle braking system.

In a non-limiting embodiment, the method 400 includes 490 and stores a plurality of the tested brake system parameters over time. Following 490, the method returns to 420 and continues to perform the first testing brake operation based on the brake system compliance suspicion value until proceeding to 460 and setting the brake system compliance suspicion value of the vehicle braking system is based on the plurality of tested brake system parameters.

In a non-limiting embodiment, the method 400 includes 500 and 510. At 500, the method 400 increments the brake system compliance suspicion value by a first value when a deviation between the tested brake system parameters is greater than a first threshold value. At 510 the method increments the brake system compliance suspicion value by a second value when the deviation between the tested brake system parameters is greater than a second threshold value. Following either 500 or 510, the method returns to 420 and continues to perform the first testing brake operation based on the brake system compliance suspicion value. In a non-limiting embodiment, the first value is greater than the second value and the first threshold value is greater than the second threshold value.

In a non-limiting embodiment, the method 400 includes 520 and does not perform the first testing brake operation of 420 until the acceptability condition is met. In a non-limiting embodiment, the acceptability condition is at least one of a vehicle standstill condition a vehicle service condition, and a vehicle operation condition.

In a non-limiting embodiment, the method includes 530 and the first testing brake operation 420 is performed when the brake system compliance suspicion value is greater than an active test threshold value In a non-limiting embodiment, the first testing brake operation includes at least one of a full system test to all wheels, a circuit test to each individual brake circuit, and a wheel test to isolate one of a plurality of wheels at a time.

In a non-limiting embodiment, the method 400 includes 540 and informs a vehicle health management system when the brake system compliance suspicion value of the vehicle braking system is greater than a predetermined suspicion value.

Figure 5:
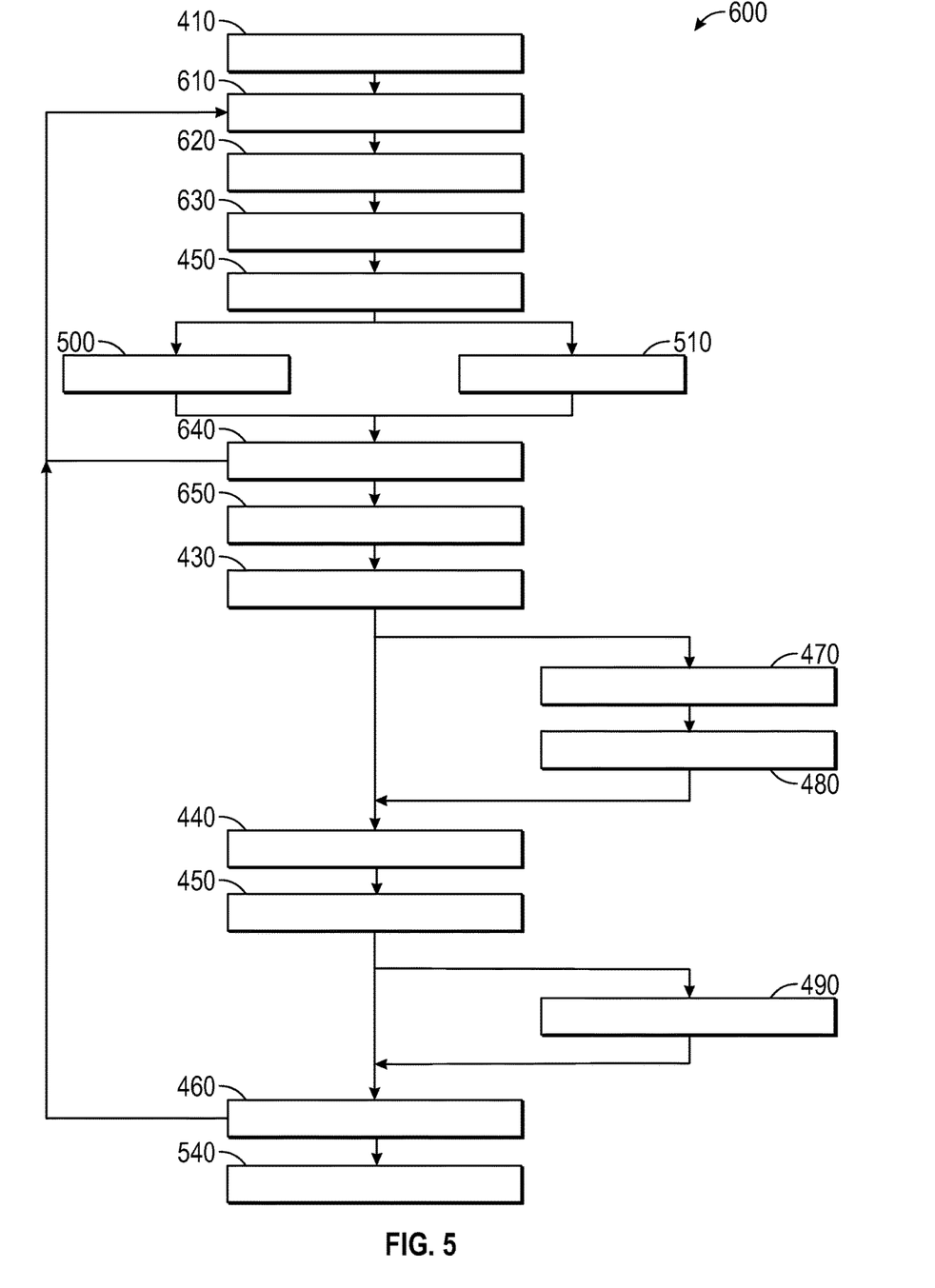
FIG. 5 is a flowchart illustrating another method for testing the braking system of the autonomous vehicle, in accordance with various embodiments.

Referring now to FIG. 5, and with continued reference to FIGS. 1-4, a flowchart illustrates a control method 600 for testing a vehicle braking system that can be performed by the system 100 of FIG. 2 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure. In various embodiments, the method 600 can be scheduled to run based on one or more predetermined events, and/or can run continuously during operation of the vehicle 10.

In general, method 600 is an algorithm that monitors brake system parameters of the vehicle braking system to identify hydraulic leaks and compliance degradations. The algorithm continually monitors the braking system by determining brake system parameters obtained from normal braking operations. This allows the algorithm to gradually monitor the braking system wear and loss of functionality. When the algorithm determines that sufficient deviation from the nominal braking parameters has occurred, the algorithm schedules an active test to more thoroughly evaluate the integrity of the braking system, as detailed above.

As method 600 contains similar steps to method 400 from FIG. 4, the same reference numerals will be used to call out method steps that are common to the two methods.

The method 600 starts at 410 and determines a nominal brake system parameter of the brake system during a braking operation. The method 600 proceeds to 610 and performs a passive testing brake operation. At 620 the passive brake system parameter is determined based on the passive testing brake operation. At 630, the tested brake system parameter is determined based on the passive brake system parameter. At 450, the tested brake system parameter is compared to the nominal brake system parameter.

At 500, the method 600 increments the brake system compliance suspicion value by a first value when a deviation between the tested brake system parameters is greater than a first threshold value. At 510 the method increments the brake system compliance suspicion value by a second value when the deviation between the tested brake system parameters is greater than a second threshold value. In a non-limiting embodiment, the first value is greater than the second value and the first threshold value is greater than the second threshold value.

Following either 500 or 510, the method 600 proceeds to 640 and compares the incremented brake system compliance suspicion value to an active test threshold value. When the incremented brake system compliance suspicion value is less than the active test threshold value, the method 600 returns to 420 and continues to perform the first testing brake operation based on the brake system compliance suspicion value.

When the incremented brake system compliance suspicion value is greater than the active test threshold value, the method 600 proceeds to 650 and schedules the active test of the braking system. At 430 the first brake system parameter is determined based on the first testing brake operation. At 440, the tested brake system parameter is determined based on the first brake system parameter. At 450, the tested brake system parameter is compared to the nominal brake system parameter and at 460, the brake system compliance suspicion value of the vehicle braking system is set based on the comparison. The method 600 the proceeds to 540 and informs a vehicle health management system when the brake system compliance suspicion value of the vehicle braking system is greater than a predetermined suspicion value. When the brake system compliance suspicion value of the vehicle braking system is less than the predetermined suspicion value, the method 600 returns to 610.

In a non-limiting embodiment, the method 600 further includes 470 and performs a second testing brake operation and 480 to determine a second brake system parameter based on the second testing brake operation. The method 600 then proceeds to 440 and determines the tested brake system parameter based on the first and second brake system parameters.

In a non-limiting embodiment of the method 600, the first testing brake operation is a low pressure brake hold for a predetermined period of time. In a non-limiting embodiment of the method 600, the first testing brake operation is a brake seating operation and the second testing brake operation is a high pressure brake hold for a predetermined period of time. In a non-limiting embodiment of the method 600, the nominal brake system parameter, first brake system parameter, second brake system parameter, and tested brake system parameters are a measurement of a volume to pressure relationship of the vehicle braking system.

In a non-limiting embodiment, the method 600 includes 490 and stores a plurality of the tested brake system parameters over time. Following 490, the method returns to 610 and continues to perform the passive testing brake operation.

In a non-limiting embodiment, the method 600 includes does schedule the active test 650 until the acceptability condition is met. In a non-limiting embodiment, the acceptability condition is at least one of a vehicle standstill condition a vehicle service condition, and a vehicle operation condition.

In a non-limiting embodiment, the first testing brake operation includes at least one of a full system test to all wheels, a circuit test to each individual brake circuit, and a wheel test to isolate one of a plurality of wheels at a time.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of testing a vehicle braking system, the method comprising:
   determining a nominal brake system parameter of the brake system during a braking operation;
   performing a first testing brake operation;
   determining a first brake system parameter based on the first testing brake operation;
   determining a tested brake system parameter based on the first brake system parameter;
   comparing the tested brake system parameter to the nominal brake system parameter; and
   setting a brake system compliance suspicion value of the vehicle braking system based on the comparison.

2. The method of claim 1, wherein the first testing brake operation is a low pressure brake hold for a predetermined period of time.

3. The method of claim 1, further comprising:
   performing a second testing brake operation;
   determining a second brake system parameter based on the second testing brake operation;
   determining the tested brake system parameter based on the first brake system parameter and the second brake system parameter.

4. The method of claim 3, wherein the first testing brake operation is a brake seating operation and the second testing brake operation is a high pressure brake hold for a predetermined period of time.

5. The method of claim 3, wherein the nominal brake system parameter, the first brake system parameter, the second brake system parameter, and the tested brake system parameter are a measurement of a volume to pressure relationship of the vehicle braking system.

6. The method of claim 1, further comprising:
storing a plurality of the tested brake system parameters over time; and
setting the brake system compliance suspicion value based on the plurality of the tested brake system parameters.

7. The method of claim 6, further comprising:
incrementing the brake system compliance suspicion value by a first value when a deviation between the tested brake system parameters is greater than a first threshold value; and
incrementing the brake system compliance suspicion value by a second value when the deviation between the tested brake system parameters is greater than a second threshold value.

8. The method of claim 7, wherein the first value is greater than the second value and the first threshold value is greater than the second threshold value.

9. The method of claim 3, wherein determining the tested brake system parameter includes estimating the tested brake system parameter as:

Tested Brake System Parameter=Second Brake System Parameter−First Brake System Parameter.

10. The method of claim 1, further comprising:
performing the first testing brake operation when an acceptability condition is met,
wherein the acceptability condition is at least one of a vehicle standstill condition a vehicle service condition, and a vehicle operation condition.

11. The method of claim 10, wherein the first testing brake operation is performed when the brake system compliance suspicion value is greater than an active test threshold value.

12. The method of claim 11, wherein the first testing brake operation includes at least one of a full system test to all wheels, a circuit test to each individual brake circuit, and a wheel test to isolate one of a plurality of wheels at a time.

13. The method of claim 1, further comprising informing a vehicle health management system when the brake system compliance suspicion value of the vehicle braking system is greater than a predetermined suspicion value.

14. A system for testing a braking system of a vehicle, the system comprising:
a brake parameter module configured for determining a brake parameter of the braking system during a brake operation;
a brake system control module for operating the brake parameter module based on a brake test profile; and
a brake system compliance module configured for determining a brake system compliance suspicion value of the braking system based on the comparison between a tested brake system parameter and a nominal brake system parameter,
wherein the tested brake system parameter is based on a first testing brake operation and the nominal brake system parameter is based on a design target parameter.

15. The system of claim 14, wherein the first brake profile includes at least one of a first testing brake operation and a second testing brake operation, the first testing brake operation selected from the group consisting of a low pressure brake hold for a predetermined period of time or a seating operation, and the a second testing brake operation including a high pressure brake hold for a predetermined period of time.

16. The system of claim 14, wherein the brake parameters are a measurement of a volume to pressure relationship of the braking system.

17. The system of claim 14, wherein the brake system compliance module is configured to store a plurality of the tested brake system parameters over time and sets the brake system compliance suspicion value based on the plurality of the tested brake system parameters.

18. The system of claim 14, wherein the brake system compliance module is configured to increment the brake system compliance suspicion value by a first value when a deviation between the tested brake system parameters is greater than a first threshold value, and
increment the brake system compliance suspicion value by a second value when the deviation between the tested brake system parameters is greater than a second threshold value.

19. The system of claim 14, further comprising:
an autonomous drive system configured to identify an acceptability condition of the vehicle, wherein the acceptability condition is at least one of a vehicle standstill condition a vehicle service condition, and a vehicle operation condition, and
wherein the brake system control module operates the brake parameter module based on the acceptability condition.

20. A vehicle, comprising:
a wheel having a brake; and
a braking system comprising;
a brake parameter module configured for determining a brake parameter of the brake during a brake operation;
a brake system control module for operating the brake parameter module based on a brake test profile; and
a brake system compliance module configured for determining a brake system compliance suspicion value of the braking system based on the comparison between a tested brake system parameter and a nominal brake system parameter,
wherein the tested brake system parameter is based on a first testing brake operation and the nominal brake system parameter is based on a design target parameter.

* * * * *